(12) United States Patent
Hino et al.

(10) Patent No.: US 7,727,325 B2
(45) Date of Patent: Jun. 1, 2010

(54) METHOD FOR MANUFACTURING PIGMENT DISPERSION

(75) Inventors: Tetsuo Hino, Yamato (JP); Takayuki Teshima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 12/323,060

(22) Filed: Nov. 25, 2008

(65) Prior Publication Data

US 2009/0139430 A1    Jun. 4, 2009

(30) Foreign Application Priority Data

Nov. 30, 2007  (JP) .............................. 2007-311393

(51) Int. Cl.
*C09B 67/20* (2006.01)
*C09B 67/00* (2006.01)
*C09B 48/00* (2006.01)

(52) U.S. Cl. .................. 106/493; 106/31.6; 106/31.77; 106/401; 106/497; 106/499

(58) Field of Classification Search ................ 106/31.6, 106/31.77, 401, 493, 497, 499
See application file for complete search history.

(56) References Cited

U.S. PATENT DOCUMENTS

| 3,316,200 | A | * | 4/1967 | Hatala ......................... 524/156 |
| 4,734,137 | A | | 3/1988 | Kasahara et al. |
| 6,607,591 | B1 | * | 8/2003 | Xia et al. ..................... 106/413 |
| 6,703,443 | B2 | * | 3/2004 | Xia et al. ..................... 524/589 |
| 7,160,380 | B2 | * | 1/2007 | Maeta et al. ................. 106/493 |
| 7,648,571 | B2 | * | 1/2010 | Deroover ................. 106/31.77 |
| 7,648,572 | B2 | * | 1/2010 | Deroover ................. 106/31.77 |
| 2008/0011193 | A1 | * | 1/2008 | Marritt .................... 106/31.89 |
| 2009/0093589 | A1 | * | 4/2009 | Bruchmann et al. ......... 524/612 |

FOREIGN PATENT DOCUMENTS

| JP | 61185568 A | 8/1996 |
| JP | 9221616 A | 8/1997 |

* cited by examiner

*Primary Examiner*—Anthony J Green
(74) *Attorney, Agent, or Firm*—Canon U.S.A., Inc., IP Division

(57) ABSTRACT

A method for manufacturing a pigment dispersion includes mixing a solution in which a pigment is dissolved in an acid, and a reaction liquid that decreases a solubility of the pigment in the solution, in the presence of a dispersant for the pigment, and causing the pigment to precipitate. The solution and reaction liquid are mixed in the presence of the dispersant and a cyclic carbonate.

8 Claims, 3 Drawing Sheets

METHOD FOR MANUFACTURING PIGMENT DISPERSION

BACKGROUND OF THE INVENTION

1. Field of the Invention

The present invention generally relates to a method for manufacturing a pigment dispersion. The present invention also relates to the manufactured pigment dispersion itself, and a recording liquid for inkjet printing that uses the pigment dispersion.

2. Description of the Related Art

Significant progress has recently been achieved in the field of digital printing technologies represented by electrophotography and inkjet technology, and these technologies have been finding ever growing application as image forming technologies in offices and homes. Water-soluble dye inks have been widely used as printing inks, but issues of blurring, feathering, and weather resistance may be associated therewith. The use of pigment inks has been studied in recent years as an improvement thereto, and inks for inkjet printing containing a pigment dispersion in an ink composition have started finding application. However, pigment particles present in pigment inks can, in some instances, cause light scattering and light reflection. As a result, images formed by pigment inks typically tend to have a color developing ability that is lower than that of the images formed by dye inks.

An attempt to decrease the size of pigment particles has been made to improve the color developing ability of pigment inks. Pigments reduced in size to less than 100 nm (referred to hereinbelow as fine pigment particles) generally produce little light reflection, and have an increased specific surface area. Therefore, they can often have color developing ability on par with that of dyes.

A dispersing machine such as a sand mill, a roll mill, and a ball mill or an ultrasonic dispersing machine, is typically used for finely dispersing pigment particles to a relatively small primary particle size (100 nm or less).

However, in this process, new active centers may be formed by the destruction of the crystal shape of pigment particles and grinding of the pigment particle surface, and these active centers can degrade the stability of dispersion with time.

Accordingly, Japanese Patent Publication No. 6-96679 recently suggested a method for manufacturing fine pigment particles by which a pigment is dissolved in a solvent, and then the obtained solution of the pigment (referred to hereinbelow as the "pigment solution") is mixed with a poor solvent of the pigment in the presence of a dispersant to cause a reprecipitation.

This method will be also referred to hereinbelow as a reprecipitation method.

The reprecipitation method provides improvements over fine powdering by an ultrasonic dispersing method or a dispersing method using a dispersing machine such as a sand mill, a roll mill, or a ball mill.

However, an aggregation force acting between the fine particles may tend to increase with the increase in the specific surface area of the particles occurring when the particles are finely ground (e.g., to a nanometer size particles).

In other words, where a fine particle dispersion is fabricated under high-concentration conditions, the aggregation of fine particles may significantly increase.

Methods for manufacturing pigment particles by using a reprecipitation method are described below.

Japanese Patent Laid-open No. 9-221616 suggests producing fine particles by an acid pasting method in which a pigment is temporarily dissolved using sulfuric acid. However, such a method typically cannot produce pigment fine particles with a size equal to or less than 100 nm.

U.S. Pat. No. 4,734,137 describes an organic pigment and a dispersant such as a surfactant or a resin that are together dissolved in an aprotic polar solvent in the presence of an alkali. The pigment is then precipitated by a reprecipitation method to obtain fine particles of organic pigment with relatively high dispersivity.

However, because this method involves dropwise adding of an acid to an organic pigment solution, and precipitating the organic pigment, the solvent is separated at the same time due to neutralization and reprecipitation.

As a result, the aggregation of pigment particles cannot be entirely prevented and a pigment of a nanometer size with an arranged particle size cannot be obtained, even when a dispersing treatment with a ball mill or the like is thereafter performed.

Thus, according to these methods, a fine particle dispersion with a high pigment concentration (for example, equal to or higher than 3 wt. %) cannot be easily obtained by merely mixing an organic pigment solution with a poor solvent in the presence of a standard dispersant.

However, where a high-concentration dispersion can be produced, it is believed that a significant increase in productivity can be achieved due to the reduction of the concentration process of dispersion and decrease in the amount of solvent used. Accordingly, there remains a strong demand for the development of a manufacturing method that can produce fine pigment particles dispersed with good stability under high pigment concentration conditions with high productivity.

SUMMARY OF THE INVENTION

In one aspect, a method for manufacturing a pigment dispersion is provided that includes mixing a solution in which a pigment is dissolved in an acid, and a reaction liquid that decreases a solubility of the pigment in the solution, in the presence of a dispersant for the pigment, and causing the pigment to precipitate. The solution and reaction liquid are mixed in the presence of the dispersant and a cyclic carbonate.

In another aspect, a pigment dispersion in accordance with the present invention is manufactured by the above-described method In a further aspect, a recording medium for an inkjet printer in accordance with the present invention includes the above-described pigment dispersion.

Further features of the present invention will become apparent from the following description of exemplary embodiments with reference to the attached drawings.

DESCRIPTION OF THE EMBODIMENTS

Figure 1:
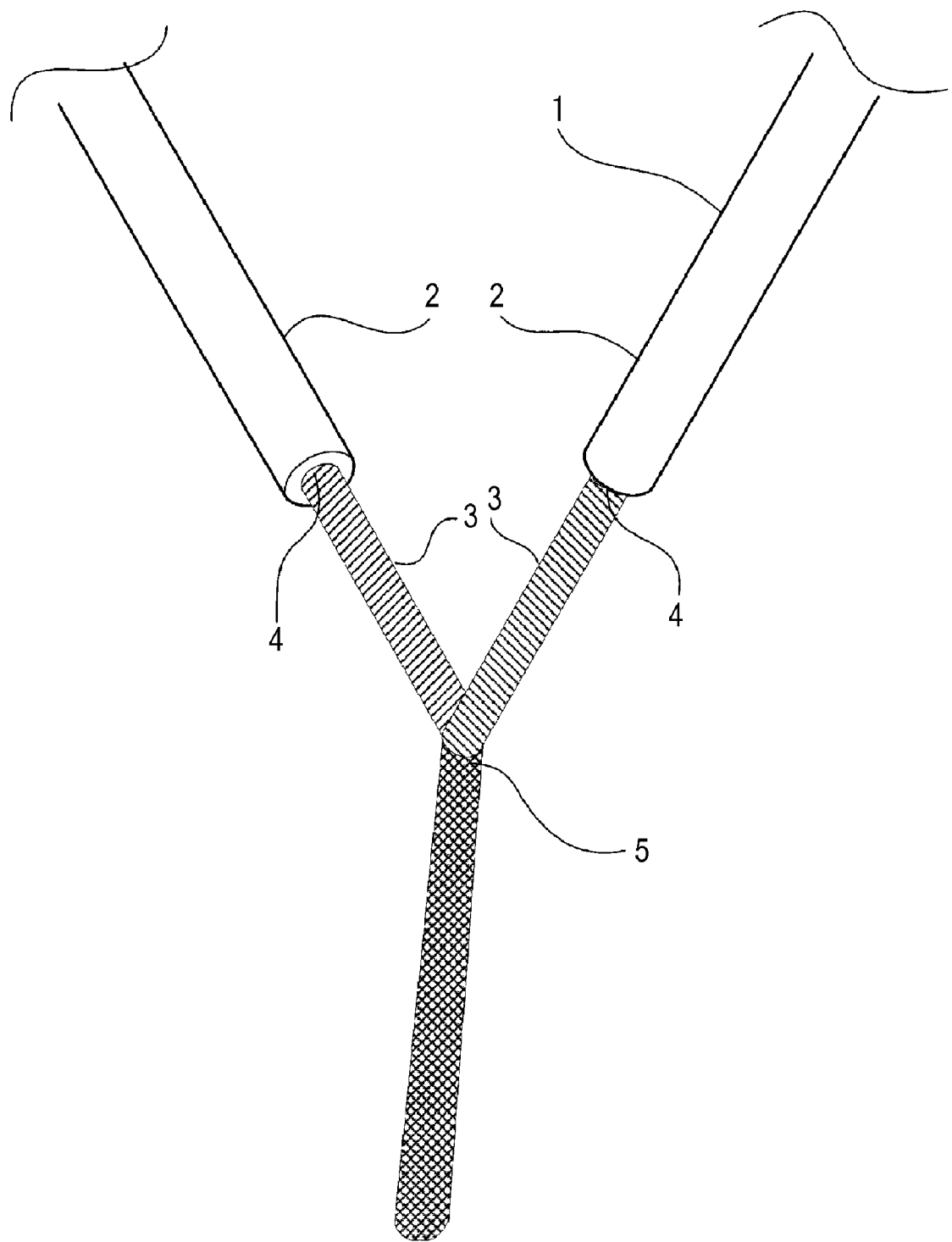
FIG. 1 is a schematic diagram of an embodiment of a mixing device for mixing microfluids in an open space using microflow channels that can be adapted for the present invention.

The present invention will be described below in greater detail.

In one embodiment, a method for manufacturing a pigment dispersion in accordance with the present invention comprises a method in which a pigment is dispersed in a dispersion medium that is obtained by mixing a solution in which the pigment is dissolved in an acid, and a reaction liquid that decreases a solubility of the pigment in the solution, in the presence of a dispersant for the pigment, and causing the pigment to precipitate, wherein the solution and reaction liquid are mixed in the presence of the dispersant and a cyclic carbonate.

In one version, the pigment may be a quinacridone. The cyclic carbonate may have a ring structure comprising 5 atoms or 6 atoms.

In one version, at least one of the solution in which the pigment is dissolved in an acid, and the reaction liquid that decreases the solubility of the pigment in the solution, is fed to a mixing region from a microchannel, and mixed therein.

An opening size of the microchannel may be from 30 μm to 1000 μm.

An acid for dissolving the pigment may be of at least one kind selected from water-soluble organic protonic acids.

According to one aspect, a pigment dispersion in accordance with the present invention may be manufactured by the above method.

According to another aspect, a recording liquid for an inkjet printer in accordance with the present invention may include the above-described pigment dispersion.

In one embodiment, the pigment used in accordance with the present invention can be any pigment selected from among inorganic pigments and organic pigments, provided that it can be dissolved in an acid. For example, the pigment may comprise an organic pigment. Among the organic pigments, a quinacridone pigment represented by the following formula may be provided.

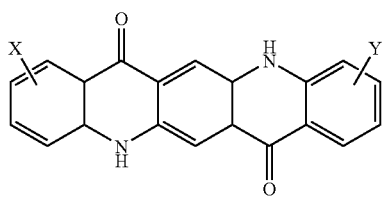

In the formula above, X and Y represent, independently from each other, a hydrogen atom, an alkyl group, or a halogen atom. In one version, the pigment comprises an unsubstituted quinacridone or a quinacridone substituted with a lower alkyl group ($C_1$-$C_3$ alkyl group) or a halogen group. According to one embodiment, the pigment compound that is selected may be stable and show no reactivity under the aforementioned conditions.

Specific examples of the quinacridone pigment may include, but are not limited to, dimethylquinacridone such as C. I. Pigment Red 122, dichloroquinacridone such as C. I. Pigment Red 202, 209, and an unsubstituted quinacridone such as C. I. Pigment Violet 19.

These pigments can be used individually or in combinations of two or more thereof.

In one version, a cyclic carbonate having a ring structure comprising 5 atoms or 6 atoms is provided as the cyclic carbonate used in accordance with the present invention. Specific examples of such cyclic carbonates may include, but are not limited to, ethylene carbonate, vinylene carbonate, propylene carbonate, 1,3-dioxane-2-one, and 4-vinyl-1,3-dioxolan-2-one. These cyclic carbonates can be used individually or in combinations of two or more thereof. In another version, a cyclic carbonate having a ring structure comprising other than 5 atoms or 6 atoms may be also provided as the cyclic carbonate used in accordance with the present invention.

In accordance with one aspect of the present invention, a solution and a reaction liquid are mixed in the co-presence of a dispersant and a cyclic carbonate. It may be important to provide the cyclic carbonate together with the dispersant. Cyclic carbonates in general may have relatively high dipole moments, and may even have very high dipole moments.

For example, the chemical formula below shows that ethylene carbonate has a dipole moment.

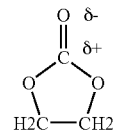

Figure 3:
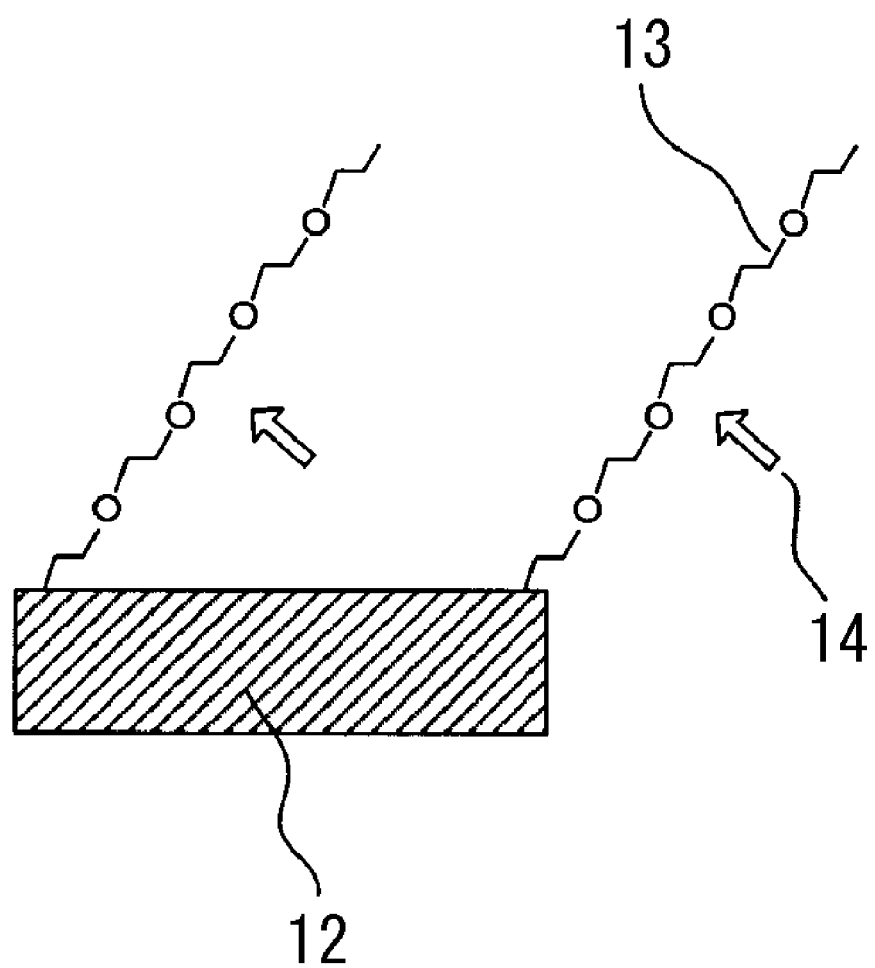
FIG. 3 is an explanatory drawing illustrating an example of a state in which the pigment in accordance with the present invention is dispersed in the co-presence of a dispersant and a cyclic carbonate.

FIG. 3 is an explanatory drawing illustrating an embodiment of a state in which a pigment in accordance with the present invention is dispersed in the co-presence of a dispersant and a cyclic carbonate. It is noted that this figure is being provided to explain principles related to the invention, and is not in any way intended to limit the invention. It is furthermore noted that embodiments according to the invention may also operate according to principles other than those specifically shown.

In the embodiment as shown in the figure, in a dispersion medium in which the precipitated pigment has been dispersed, a dispersant 13, which may include a surfactant such as polyoxycetyl ether, has adhered to the precipitated pigment 12.

In such a state in which the pigment and surfactant are present, the dispersed pigment particles can aggregate. However, where a polarized cyclic carbonate 14 (i.e., a cyclic carbonate 14 having a dipole moment) is present, the cyclic carbonate 14 can act upon the dispersant 13 adhering to the precipitated pigment, and may inhibit the aggregation of pigment dispersion.

Because the cyclic carbonate provided in accordance with embodiments of the invention may have a very high dipole moment, for example as demonstrated hereinabove by ethylene carbonate, it may be coordinated with the aggregates that have been generated at the precipitation stage and may prevent excessive aggregation. Thus, the cyclic carbonate may thereby restrict a mean particle size of the pigment dispersion.

Thus, the cyclic carbonate can act upon the pigment dispersion that has been precipitated by a reprecipitation method, and is also believed to act as a pigment dispersing enhancer to prevent the excessive aggregation of pigment dispersion even under high-concentration pigment dispersing conditions.

On the other hand, carbonates that are not cyclic typically have a dipole moment that is lower than that of cyclic carbonates. As a result, non-cyclic carbonates are believed to demonstrate only a small effect as pigment dispersing enhancers.

In fact, when a non-cyclic carbonate is used instead of the cyclic carbonate, the mean particle size of the obtained pigment dispersion generally increases.

Furthermore, cyclic carbonates having either 4 atoms or 7 or more atoms in the ring structure tend to be generally less stable in acidic media than the cyclic carbonates having a ring structure with 5 or 6 atoms, and when the former carbonates are used as the cyclic carbonate, the mean particle size of the pigment dispersion generally increases.

Furthermore, cyclic carbonates having either 4 atoms or 7 or more atoms in the ring structure have a tendency not to be easily synthesized. Another aspect is that the production yield thereof might not be high and, therefore, they can be costly.

The ratio at which the cyclic carbonate is used is not particularly limited, and in one version it can be used in an amount equal to or higher than 0.05 part by weight and equal to or less than 5 part by weight, such as equal to or higher than 0.1 part by weight and equal to or less than 2 parts by weight, based on 1 part by weight of the pigment.

In certain cases, when the cyclic carbonate amount is less than 0.05 part by weight, the dispersing effect may tend to decrease. Also, when the dispersant is added in an amount higher than 5 part by weight, it may be the case that the dispersing effect is not substantially improved and cost efficiency may be low.

In one embodiment, the dispersant used in accordance with the present invention is dissolved in an acid, or a mixed liquid of an acid and an organic solvent. A dispersant that is soluble in water and can demonstrate a sufficient dispersing effect with respect to a pigment in an aqueous solution also can be appropriately used.

In one version, a surfactant may be provided as the dispersant, with the surfactant having a molecule containing at least one species selected from among a cationic nitrogen atom, a hydroxyl group, and an alkylene oxide. A compound that is dissolved with good stability together with the pigment in an acid or in an organic solvent in the presence of an acid may be provided.

In certain cases, when the hydrophilic portion of the dispersant is configured only by a group selected from a carboxylic group, a sulfonic group, and a phosphoric group, the dispersion stability in a pigment dispersion including an acid may become comparatively low.

Specific examples of surfactants suitable as the dispersant can be appropriately selected from the conventional well-known surfactants and derivatives thereof. For example suitable surfactants can include, but are not limited to, cationic surfactants such as alkylamine salts, dialkylamine salts, tetralkylammonium salts, benzalconium salts, alkylpyridinium salts, and imidazolinium salts;

nonionic surfactants such as polyoxyethylene alkyl ethers, polyoxyethylene alkylphenyl ethers, polyoxyethylene fatty acid esters, sorbitan fatty acid esters, acetylene glycol ethylene oxide adducts, glycerin ethylene oxide adducts, and polyoxyethylene sorbitan fatty acid esters; and also amphoteric surfactants such as alkylbetain and amidobetain, silicone surfactants, and fluorine-containing surfactants.

In one version, a polymer compound can be also used as the dispersant. The dispersants can be used individually or in combinations of two or more kinds thereof.

The ratio at which the dispersant is used is not particularly limited. Thus, in one version, the dispersant can be used in an amount equal to or higher than 0.05 part by weight and equal to or less than 5 parts by weight, such as equal to or higher than 0.1 part by weight and equal to or less than 2 parts by weight, per 1 part by weight of the pigment.

In certain cases, when the dispersant amount is less than 0.05 part by weight, the dispersing effect may tend to decrease. Also, when the dispersant is added in an amount higher than 5 parts by weight, it may be the case that the dispersing effect is not substantially improved and cost efficiency may be low.

The acid provided is not particularly limited, provided that the pigment can be dissolved in the acid either alone or in a mixture thereof with an organic solvent. In one version, the acid comprises an organic protonic acid.

Where an inorganic protonic acid is used, it may be the case that when the content of water is high, the pigment is either not dissolved or reprecipitates instantaneously after being dissolved. As a result, a high-concentration uniform pigment solution may be difficult to obtain.

On the other hand, when the water content is low (for example, in a concentrated sulfuric acid), it may be possible that a high-concentration uniform pigment solution can be obtained, but it may also be the case that the viscosity of the solution obtained is high and the solution may be difficult to handle.

Furthermore, quinacridone pigments can be dissolved not only in acids, but also in alkalis. However, the acids may have a capacity to dissolve quinacridone pigments that is higher than that of the alkalis. Thus, according to one embodiment of the invention, when quinacridone pigment particles are fabricated under high-concentration pigment conditions, the pigment may be dissolved using an acid.

Specific examples of organic protonic acids can include, but are not limited to, alkylsulfonic acids such as methanesulfonic acid, ethanesulfonic acid, propanesulfonic acid, and butanesulfonic acid;

halogenated alkylsulfonic acids obtained by substitution of the aforementioned acids with halogens, for example, trifluoromethanesulfonic acid, pentafluoroethanesulfonic acid, heptafluoropropanesulfonic acid, nonafluorobutanesulfonic acid, trifluoromethanesulfonic acid, and trimethylsilyl; and halogenated alkylcarboxylic acids such as trifluoroacetic acid, trichloroacetic acid, chlorocaproic acid, bromocaproic acid, and chloroundecanic acid.

This list of suitable organic protonic acids is not limiting. Furthermore, these acids can be used individually or in combinations of two or more kinds thereof.

Optionally, a water-soluble organic solvent, a crystal growth inhibitor, an ultraviolet absorber, an antioxidant, and a resin additive can be appropriately added to the pigment solution in which the pigment is dissolved in the acid.

In one version, water-soluble organic solvents that dissolve the pigment and dispersant in the presence of an acid, and that can be freely mixed with water, are provided.

Specific examples of such water-soluble organic solvents can include, but are not limited to, alkyl alcohols having 1 to 3 carbon atoms (for example, methanol, ethanol, and isopropylalcohol), ketones or ketoalcohols (for example, acetone and diacetone alcohol), amides (for example, dimethylformamide and dimethylacetamide), ethers (for example, tetrahydrofuran and dioxane), polyalkylene glycols (for example, polyethylene glycol and polypropylene glycol), alkylene glycols in which the alkylene group contains 2 to 6 carbon atoms (for example, ethylene glycol, propylene glycol, butylene glycol, triethylene glycol, 1,2,6-hexanetriol, hexylene glycol, and diethylene glycol), alkyl ethers of polyhydric alcohols (for example, ethylene glycol methyl ether and ethylene glycol ethyl ether), alkylcarboxylic acids (for example, acetic acid and butyric acid), and also N-methylpyrrolidone, 2-pyrrolidone, acetonitrile, and γ-butyrolactone.

Crystal growth inhibitors that are well known in the related field can also be appropriately used.

Examples of crystal growth inhibitors suitable for use with quinacridone pigments can include, but are not limited to, quinacridone phthalimidomethyl derivatives, quinacridone sulfonic acid derivatives, quinacridone N-(dialkylamino)methyl derivatives, and quinacridone N-(dialkylaminoalkyl)sulfonic acid amide derivatives.

Examples of the ultraviolet absorber can include, but are not limited to, metal oxides, aminobenzoate ultraviolet absorbers, salicylate ultraviolet absorbers, benzophenone ultraviolet absorbers, benzotriazole ultraviolet absorbers, cinnamate ultraviolet absorbers, nickel chelate ultraviolet absorbers, hindered amine ultraviolet absorbers, urocanine ultraviolet absorbers, and vitamin ultraviolet absorbers.

Examples of the antioxidant can include, but are not limited to, hindered phenol compounds, thioalkane acid ester compounds, organophosphorus compounds, and aromatic amines.

Examples of the resin additive can include, but are not limited to, synthetic resins such as modified polyvinyl alcohol, polyurethane, carboxymethyl cellulose, polyesters, polyallylamines, polyvinyl pyrrolidone, polyethylene imines, polyaminesulfones, polyvinylamines, hydroxyethyl cellulose, hydroxypropyl cellulose, melamine resins, and modification products thereof.

Each of these water-soluble organic solvent, crystal growth inhibitor, ultraviolet absorber, and resin additive can be used individually or in combinations of two or more kinds thereof.

Water or a water-containing organic solvent of general use can be employed to decrease the solubility of pigment in the solvent used in accordance with the present invention.

A reaction liquid can include water and an aqueous solution including a dispersant. In one version, the above-described dispersants can be used as the dispersant. In certain cases, an acid and a water-soluble organic solvent, such as one or more of methanol and ethanol, can be added sequentially.

A solution in which the pigment is dissolved in the acid, and a reaction liquid that decreases the solubility of pigment in the solution, are mixed together in the presence of a dispersant for the pigment and a cyclic carbonate, to precipitate the pigment.

In one version, in the mixing process, mixing with the reaction liquid may be performed as fast as possible to obtain a pigment dispersion of a nanometer order having good uniformity of particle size.

The dispersing method is not particularly limited. In a case using ultrasonic waves or a homogenizer, it may be suitable to use such ultrasonic waves or a homogenizer on condition that the pigment particles are not too damaged.

In one version, a well-known device that has been conventionally used for stirring, mixing, dispersing, and precipitating crystals, such as a full-zone stirring blade, a stirring device of an internal circulation type, and a stirring device of an external circulation type, can be used.

In another version, the solution and the reaction liquid may be charged into a reaction region in the form of a jet flow from a nozzle such as a syringe, a needle, and a tube. In one embodiment, a plurality of nozzles can be used for charging in order to perform the charging within a short time.

According to yet another version of the invention, the mixing may be performed by feeding the solution and the reaction liquid to a mixing region from at least one microchannel.

A specific opening size of a microchannel may be, for example, from 30 μm to 1000 μm. When the opening size is below this range, the reaction liquid sometimes cannot be skillfully fed to the mixing field due to a pressure drop in the flow channel, or the like.

Also, when the opening size is above the aforementioned range, pigment fine particles with good size uniformity are often difficult to obtain.

Using a microfluid supplied from a microchannel is believed to improve mixing speed and mixing uniformity in the liquid mixing process.

An example of such a process is liquid mixing in a microscale space using a microreactor.

The microreactor is a general term for reaction and mixing devices having a plurality of microscale flow channels.

For details relating to microreactors, see, for example, "Microreactors, New Technology for Modern Chemistry" (Wolfgang Ehrfeld, Volker Hessel, Holger Loewe, WILEY-VCH, published in 2000).

Because the surface area per unit volume in a microscale space is relatively large, the microscale space is considered to be very useful for diffusion mixing at an interface where a plurality of laminar flows come into contact. Furthermore, in a microscale space, molecular transport, reaction, and separation may be performed relatively rapidly by the spontaneous behavior of molecules, even without requiring mechanical stirring or the like.

Therefore, in the case of a reaction using a microreactor, the reaction speed generally can be increased in comparison with that of a reaction that proceeds under a turbulent flow.

Furthermore, it can also be the case that a plurality of liquids come into contact at the same timing at all times and mix or react, while forming a laminar flow. As a result, the orderliness of uniform mixing or reaction can be maintained.

For example, where a fine particle generation reaction is performed using a microreactor, it can be the case that the reaction proceeds instantaneously, a large number of nuclei are produced, and a large number of particles grow based thereon. Therefore, fine particles with a small primary particle size can be formed. Further, due to the orderliness of the reaction, a narrow particle size distribution can also be obtained.

According to one embodiment of the present invention, the temperatures of the solution and reaction liquid, or the temperature of the solution when the reaction liquid is admixed, may affect the transportability and flowability of the reaction liquid and the solution obtained by mixing the liquids.

Furthermore, in certain embodiments, these temperatures may greatly affect the size of pigment particles precipitating during reprecipitation.

Therefore, in one version the solution temperature may be appropriately controlled to a range of from −20° C. to 100° C., to obtain a pigment particle dispersion of a nanometer order.

According to one aspect, the pigment dispersion manufactured in accordance with the present invention can be advantageously used as a coloring agent of a recording liquid for an inkjet printer.

In this case, the concentration of pigment dispersion in the inkjet recording liquid may be adjusted to provide coloring power, for example the pigment may be contained in an amount of 2.0 parts by weight to 10.0 parts by weight per 100 parts by weight of the inkjet recording liquid.

In one version, in order to prevent the recording liquid for an inkjet printer in accordance with the present invention from drying in the nozzle and solidifying, and also in order to adjust the viscosity, a water-soluble organic solvent can be added to the recording liquid in an amount within a range in which the dispersion stability of the pigment is not degraded.

Examples of suitable water-soluble organic solvents can include, but are not limited to, alkyl alcohols having 1 to 4 carbon atoms (for example, methanol, ethanol, n-propyl alcohol, isopropyl alcohol, n-butyl alcohol, sec-butyl alcohol, and tert-butyl alcohol), ketones or ketoalcohols (for example, acetone and diacetone alcohol), amides (for example, dimethylformamide and dimethylacetamide), ethers (for example, tetrahydrofuran and dioxane), polyalkylene glycols (for example, polyethylene glycol and polypropylene glycol), alkylene glycols in which the alkylene group contains 2 to 6 carbon atoms (for example, ethylene glycol, propylene glycol, butylene glycol, triethylene glycol, 1,2,6-hexanetriol, hexylene glycol, and diethylene glycol), alkyl ethers of polyhydric alcohols (for example, ethylene glycol methyl ether and ethylene glycol ethyl ether, triethylene monomethyl ether, and triethylene glycol monoethyl ether), and also N-methylpyrrolidone, 2-pyrrolidone, and dimethylimidazolidinone.

The total amount of the water-soluble organic solvents in the ink may be from 2 parts by weight to 60 parts by weight, such as from 5 parts by weight to 25 parts by weight, based on the total amount of the ink.

In one version, a surfactant can be further added to the recording liquid for an inkjet printer in accordance with the present invention, to adjust the penetration into paper and increase the dispersion stability of the pigment dispersion.

For example, conventional well-known surfactants such as nonionic surfactants, cationic surfactants, amphoteric surfactants, fluorine-containing surfactants, and silicon-containing surfactants can be advantageously used as the surfactant.

In one version, the amount of the surfactant in the ink may be from 0.05 part by weight to 10 parts by weight, such as from 0.1 part by weight to 5 parts by weight, based on the total weight of the ink.

In addition to the above-described pigment dispersion, water-soluble organic solvent, and surfactant, an additive such as a fungicide, an antioxidant, and a pH adjuster may also be appropriately compounded with the recording liquid for an inkjet printer, in accordance with the present invention.

The pigment dispersion produced in accordance with the present invention can be used as an aqueous coloring agent within a wide range of applications, including but not limited to printing liquid for inkjet printer, printing ink, toner, paint, ink for writing, coating materials for film, coloring agents for ferroelectric printers, liquid developers, materials for electrophotography, coloring agents for plastics, coloring agents for rubbers, and coloring agents for fibers.

EXAMPLES

The present invention will be described below in greater detail based on examples thereof. However, the present invention is not limited to the particular examples herein.

The mean particle size of pigment particles was measured using DLS-7000 (manufactured by Otsuka Denshi KK) after diluting with ion-exchange water and filtering with a 2 µm membrane filter.

Example 1

A total of 120 mL of methanesulfonic acid was added to 30 g of a 2,9-dimethylquinacridone pigment C. I. Pigment Red 122, the components were stirred for 20 min at 120° C. under a nitrogen gas flow in a flask, the quinacridone pigment was completely dissolved, and a solution of a deep bluish purple color was obtained.

The solution obtained was cooled to room temperature. Then, a mixed solution obtained by dissolving 11.5 g of polyoxycetyl ether as a dispersant and 11.5 g of ethylene carbonate, which is a cyclic carbonate, in 50 mL of acetonitrile was gradually added to 50 mL of the solution and an acidic pigment solution was prepared.

The solution obtained was introduced at a rate of 5 mL/min from an opening 4 (flow diameter 250 µm) of one nozzle 2 of a mixing device 1 such as shown in FIG. 1, an aqueous solution containing 0.1 wt. % polyoxyethylene lauryl ether was introduced at 9.25 mL/min from an opening 4 (flow diameter 250 µm) of the other nozzle 2 of the mixing device, and the two solutions were mixed. In FIG. 1, numeral 3 denotes fluids and numeral 5 denotes a merged flow of the fluids.

As a result, parts of these two flow channels came into contact with each other, a laminar flow was produced, uniform mixing was carried out, and a high-concentration (concentration 3 wt. %) quinacridone pigment of magenta color was produced.

In this case, the pigment particles were dispersed by the dispersant in the aqueous solution. The obtained aqueous dispersion of quinacridone pigment was purified using an ultrafiltration system (manufactured by Asahi Chemical Industries Co., Ltd., Microser R-UF, pencil-type module).

When the pigment dispersion thus obtained was allowed to stay for two weeks, no precipitates were formed and the dispersion was stable.

Further, the aqueous solution of the pigment dispersion had high transparency.

When the mean particle size of the pigment dispersion was measured in distilled water at 25° C., the mean particle size was 90 nm and the particle size distribution was very narrow.

When the dispersion product containing the pigment dispersion as a coloring substance was used as an inkjet ink, loaded in an ink tank of a BJ printer F900 (Canon Inc.), and printed on the usual paper, a beautiful print was obtained.

Comparative Example 1

An attempt was made to produce quinacridone pigment fine particles, without adding ethylene carbonate, under the conditions of Example 1. Light scattering at a significant level higher than that obtained in Example 1 was observed in the produced quinacridone pigment dispersion even in naked-eye observations, and greatly aggregated pigment particles were obtained.

The mean particle size of the pigment particles did not become equal to or less than 200 nm.

When the pigment dispersion liquid thus obtained was dispersed with a homogenizer, the particle size decreased as the dispersing time increased from 5 min to 10 min and then to 20 min. For example, when dispersing with the homogenizer was conducted for 10 min, the particle size became 85 nm.

However, aggregation of particles occurred with the passage of time and the particle size became 180 nm after 5 days. Further, when dispersing was performed in a similar manner by using ultrasonic waves instead of the homogenizer, the particle size decreased as the dispersing time increased from 5 min to 10 min and then to 20 min. For example, when irradiation with ultrasonic waves was performed for 20 min, the particle size became 45 nm.

However, in this case, the aggregation of particles also occurred with the passage of time and the particle size became 160 nm after 5 days.

Example 2

A total of 70 mL of methanesulfonic acid and 30 mL of trifluoroacetic acid were added to 36 g of an unsubstituted quinacridone pigment, the components were stirred for 20 min at 150° C. under a nitrogen gas flow in a flask, the quinacridone pigment was completely dissolved, and a solution of a deep bluish purple color was obtained.

The solution obtained was cooled to room temperature, a solution obtained by dissolving 18 g of polyoxycetyl ether and 2 g of dodecyltrimethylammonium chloride in 100 mL of ethylene carbonate warmed up to 40° C. was gradually added to 50 mL of the solution, and an acidic pigment solution was prepared.

Figure 2:
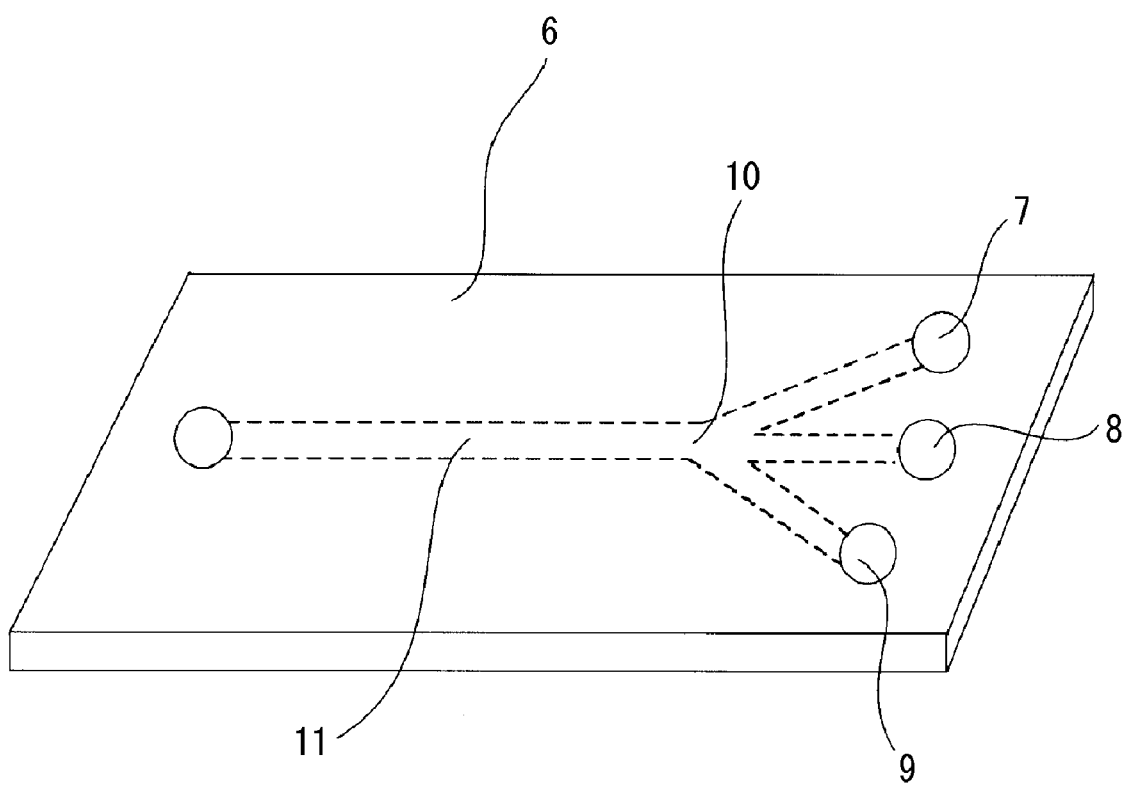
FIG. 2 is a schematic diagram of an embodiment of a mixing device for mixing microfluids in a closed space using microflow channels that can be adapted for the present invention.

The solution obtained was introduced at a rate of 11 mL/min from a supply port 8 (flow diameter 700 µm) of a mixing device (microreactor) 6 such as shown in FIG. 2, an aqueous solution containing 0.1 wt. % polyoxyethylene lauryl ether was introduced from the remaining supply port 7 (flow diameter 260 µm) and supply port 9 (flow diameter 240 µm) at 15 mL/min and 8 mL/min, respectively, and the two were introduced in a mixing region 10 and mixed. In FIG. 2, numeral 11 denotes a microchannel.

As a result, parts of these two flow channels came into contact with each other, a laminar flow was produced, uniform mixing was carried out, and a high-concentration (concentration 4 wt. %) quinacridone pigment of magenta color was produced.

In this case, the pigment particles were dispersed by the dispersant in the aqueous solution. The obtained aqueous dispersion of quinacridone pigment was purified using an ultrafiltration system (manufactured by Asahi Chemical Industries Co., Ltd., Microser R-UF, pencil-type module).

When the pigment dispersion thus obtained was allowed to stay for two weeks, no precipitates were formed and the dispersion was stable. Further, the aqueous solution of the pigment dispersion had high transparency.

When the mean particle size of the pigment dispersion was measured in distilled water at 25° C., the mean particle size was 95 nm and the particle size distribution was very narrow.

When the dispersion product containing the pigment dispersion as a coloring substance was used as an inkjet ink, loaded in an ink tank of a BJ printer F900 (Canon Inc.), and printed on the usual paper, a beautiful print was obtained.

Comparative Example 2

An attempt was made to produce quinacridone pigment fine particles, without adding ethylene carbonate, under the conditions of Example 2. Light scattering at a significant level higher than that obtained in Example 2 was observed in the produced quinacridone pigment dispersion even in naked-eye observations, and greatly aggregated pigment particles were obtained.

The mean particle size of the pigment particles did not become equal to or less than 200 nm.

Example 3

A total of 60 mL of methanesulfonic acid was added to 12 g of a 2,9-dimethylquinacridone pigment C. I. Pigment Red 122, and the components were stirred for 20 min at 150° C. under a nitrogen gas flow in a flask.

As a result, the quinacridone pigment was completely dissolved, and a solution of a deep bluish purple color was obtained.

The solution obtained was cooled to room temperature. Then, a solution obtained by mixing 10 g of polyoxycetyl ether and 50 g of 1,3-dioxane-2-one with 10 mL of acetic acid was added and an acidic pigment solution was prepared.

The solution obtained was introduced from a syringe with a needle inner diameter (flow diameter) of 500 µm in 120 mL of an aqueous solution obtained by stirring methanol and water at a volume ratio of 1:10 with a stirrer, and the solutions were thereby mixed.

As a result, a high-concentration (concentration 5 wt. %) quinacridone pigment of magenta color was produced. In this case, the pigment particles were dispersed by the dispersant in the aqueous solution.

The obtained aqueous dispersion of quinacridone pigment was purified using an ultrafiltration system (manufactured by Asahi Chemical Industries Co., Ltd., Microser R-UF, pencil-type module).

When the pigment dispersion thus obtained was allowed to stay for two weeks, no precipitates were formed and the dispersion was stable. Further, the aqueous solution of the pigment dispersion had high transparency.

When the mean particle size of the pigment dispersion was measured in distilled water at 25° C., the mean particle size was 100 nm and the particle size distribution was very narrow.

When the dispersion product containing the pigment dispersion as a coloring substance was used as an inkjet ink, loaded in an ink tank of a BJ printer F900 (Canon Inc.), and printed on the usual paper, a beautiful print was obtained.

Comparative Example 3

An attempt was made to produce quinacridone pigment fine particles, without adding 1,3-dioxane-2-one, under the conditions of Example 3. Light scattering at a significant level higher than that obtained in Example 3 was observed in the produced quinacridone pigment dispersion even in naked-eye observations, and greatly aggregated pigment particles were obtained.

The mean particle size of the pigment particles did not become equal to or less than 200 nm.

Example 4

An aqueous solution with a dispersed pigment having high transparency was also obtained by using copper phthalocyanine as a pigment and performing operations in the same manner as described above under the conditions of Example 1.

Preparation of Ink Composition

The aqueous solution of pigment dispersion that was obtained in Example 1 was concentrated to obtain a concentration liquid with a pigment concentration of 10%.

An ink composition was prepared by mixing 50 parts by weight of the aqueous solution of pigment dispersion, 7.5 parts by weight of diethylene glycol, 5 parts by weight of glycerin, 5 parts by weight of trimethylol propane, 0.2 part by weight of acetylenol EH, and 32.3 parts by weight of ion-exchange water.

Printing Evaluation

The prepared ink composition was loaded in a BJ printer F900 (Canon Inc.), and inkjet recording of a solid image was performed on the usual paper. Visual evaluation of the print confirmed a crisp color tone.

The above mentioned examples provide methods for manufacturing a pigment dispersion in which fine pigment particles are dispersed with good stability at a high pigment concentration, without requiring employment of a treatment with a dispersing machine such as a sand mill and ball mill or an ultrasonic dispersing machine.

The above mentioned examples make it possible to obtain a dispersion of fine pigment particles that has a high pigment concentration and size uniformity.

Accordingly, the pigment dispersion can be used for the manufacture of an aqueous coloring liquid that excels in color developing ability and light transparency, in particular a recording liquid advantageously suitable for inkjet recording. In particular, a recording medium for an inkjet printer can be provided that uses the above-described pigment dispersion and excels in color developing ability and light transmittance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-311393, filed Nov. 30, 2007, which is hereby incorporated by reference herein in its entirety.

What is claimed is:

1. A method for manufacturing a pigment dispersion, the method comprising:

mixing a solution in which a pigment is dissolved in an acid, and a reaction liquid that decreases a solubility of the pigment in the solution, in the presence of a dispersant for the pigment, and causing the pigment to precipitate, wherein the solution and the reaction liquid are mixed in the presence of the dispersant and a cyclic carbonate.

2. The method for manufacturing a pigment dispersion according to claim 1, wherein the pigment is a quinacridone.

3. The method for manufacturing a pigment dispersion according to claim 1, wherein the cyclic carbonate comprises a ring structure comprising 5 atoms or 6 atoms.

4. The method for manufacturing a pigment dispersion according 1, wherein at least one of the solution in which the pigment is dissolved in the acid, and the reaction liquid that decreases the solubility of the pigment in the solution, is fed to a mixing region from a microchannel and mixed.

5. The method for manufacturing a pigment dispersion according to claim 4, wherein an opening size of the microchannel is from 30 μm to 1000 μm.

6. The method for manufacturing a pigment dispersion according to claim 4, wherein the acid for dissolving the pigment is of at least one kind selected from water-soluble organic protonic acids.

7. A pigment dispersion manufactured by the method described in claim 1.

8. A recording liquid for an inkjet printer, comprising the pigment dispersion according to claim 7.

* * * * *